Figure 3:
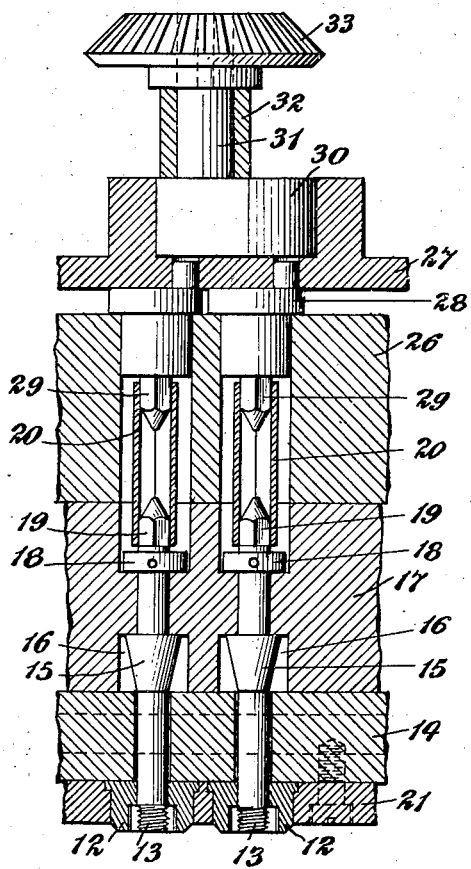

Jan. 23, 1934.  W. E. RAHM  1,944,571
MOLDING MACHINE
Filed July 30, 1932  2 Sheets-Sheet 1
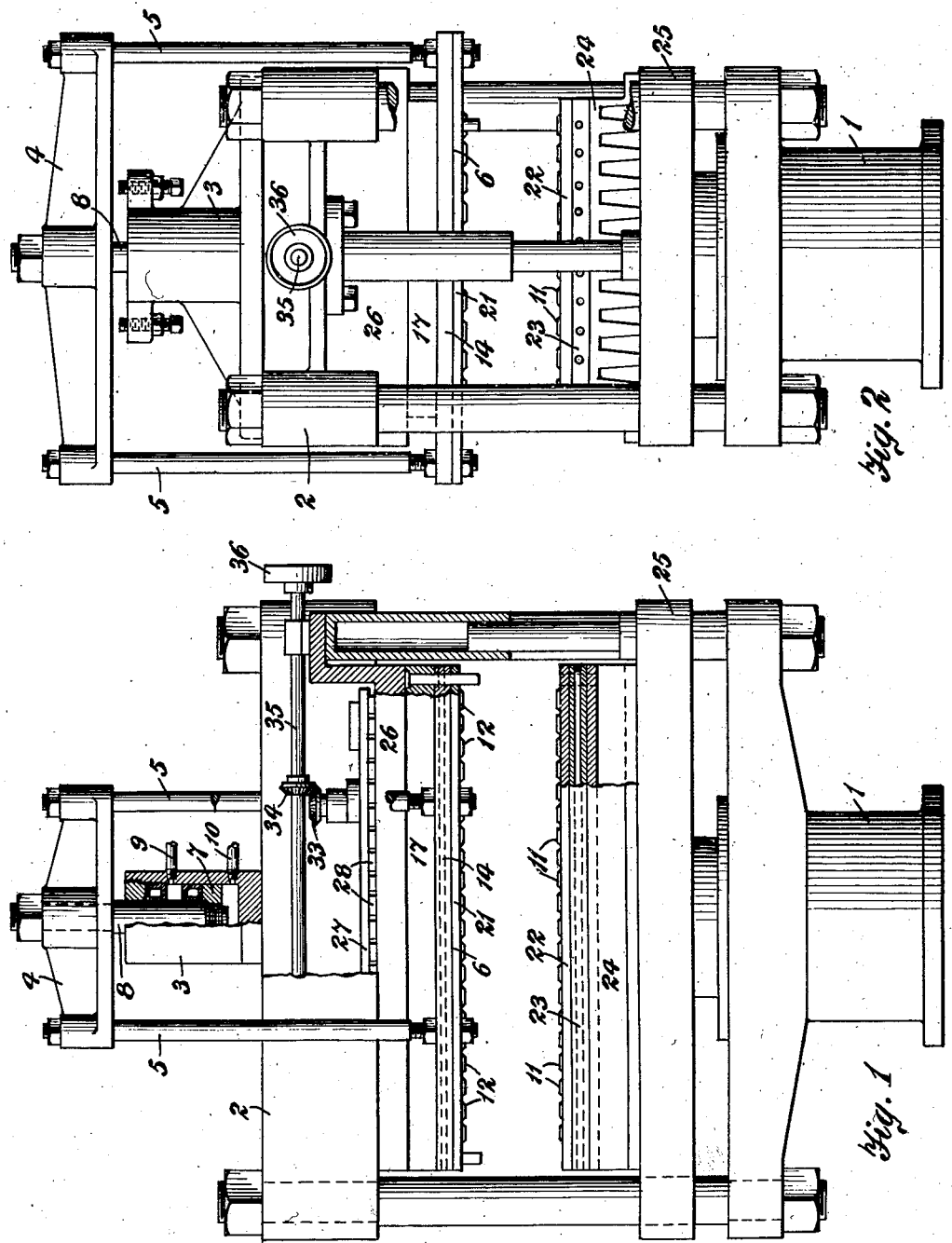
INVENTOR:-
Walter E. Rahm,
BY
Lewis J. Doolittle,
ATTORNEY.

Jan. 23, 1934.  W. E. RAHM  1,944,571

MOLDING MACHINE

Filed July 30, 1932  2 Sheets-Sheet 2

INVENTOR:-
Walter E. Rahm,
BY
Lewis J. Doolittle,
ATTORNEY.

Patented Jan. 23, 1934

1,944,571

UNITED STATES PATENT OFFICE 1,944,571

MOLDING MACHINE

Walter E. Rahm, Montclair, N. J., assignor to Plastic Products Engineering Corporation Application July 30, 1932. Serial No. 626,366

8 Claims. (Cl. 18—17)

The object of this invention is to provide certain improved features in a molding machine adapted for molding objects from thermo-plastic material. The invention relates more particularly to the means for removing the molded object from the machine after the molding operation is completed, especially objects such as a threaded cap from which the part of the mold forming the threads must be unscrewed to release the same from the mold.

A further object of the invention is to provide means for removing or scavenging any rind of molded material, formed by any surplus material being forced out of the mold and adhering to the object, by the pressure between the mold sections in the press.

Thermo-plastic material as supplied to the molding trade is usually in the form of a powder and this material is preformed as a tablet of the required size and weight to charge the mold cavity and the molding is done under heat and pressure in hydraulic or other type of presses.

An important feature of this invention is the provision of means forming a part of the press mechanism, which operates automatically to release or unscrew the threaded portion of the mold from the object when finished, thereby automatically ejecting and releasing the same from the mold and thus avoiding the necessity of removing the mold, or a part of the same, from the press to a separate device for unscrewing and releasing the molded object.

One advantage of the present invention is in the compact construction and arrangement of the mechanism which permits a large number of articles to be simultaneously formed or molded in the same press and ejected and released therefrom, which is possible by reason of the avoiding of the necessity of removing the molds from the press, in which case the weight and size of a large number of molds would render the removal unpractical, as well as increasing the cost of manufacture by reason of the additional operations involved.

For the purpose of illustration, I have shown the invention embodied in an hydraulic type of power press but it will be understood that the particular features of the press, or the type of press, is not material to or a part of the present invention, as will be understood from the description of the embodiment of the invention shown.

In the drawings, like parts in the several views have been given the same reference numeral.

Figure 5:
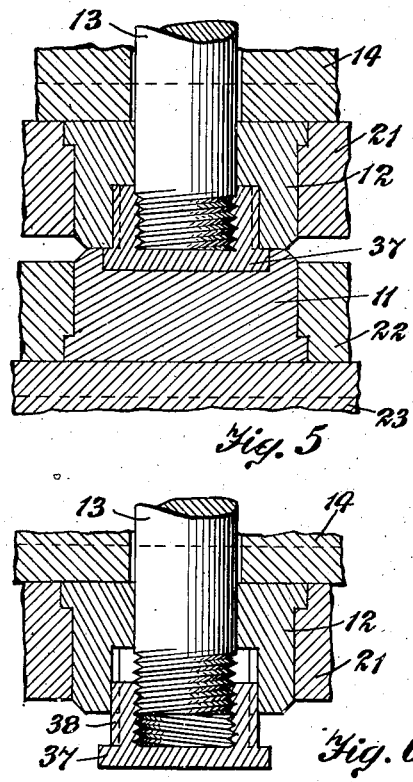
Figure 6:
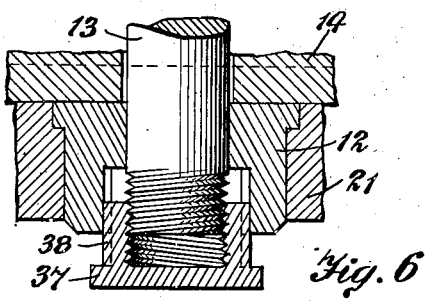
Figure 7:
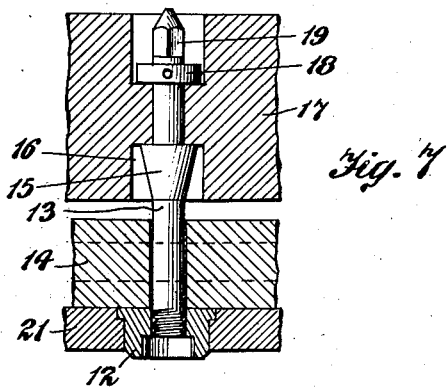
Figure 4:
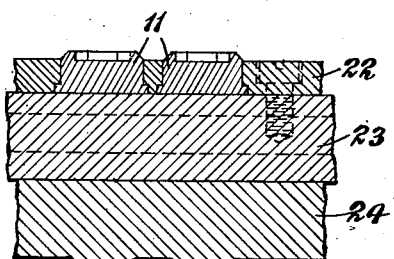
Figure 8:
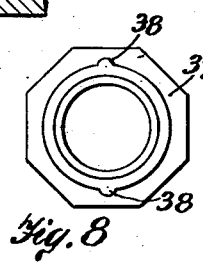
Figure 9:

Fig. 1 is a general side elevation of an hydraulic press molding machine; Fig. 2 is an end elevation thereof; Fig. 3 is an enlarged detail section showing two of the upper or mold cavity sections and the ejecting and releasing mechanism carried in the upper part of the press; Fig. 4 is a like view showing the lower parts of the mold and mounting; Fig. 5 is a detail view in a further enlarged section of the mold sections closed and the object completed or formed therein ready to be released; Fig. 6 is a detail of the upper part of Fig. 5 showing the article being released and partly ejected out of the upper mold cavity section; Fig. 7 is detail of a part of Fig. 3, showing the parts open and the threaded pin withdrawn from the mold cavity, which is then ready for charging with the thermo-plastic material; Fig. 8 is a detail view of one form of the object to be formed or molded, in top elevation; and Fig. 9 is a side view of Fig. 8.

Referring to Figs. 1 and 2, one form of an hydraulic press is shown, provided with an operating cylinder 1 for operating the press head 2, in the usual manner which is well understood, a differential hydraulic cylinder 3 operates the yoke 4 which is connected through the rods 5 to operate the slidable members 6, which slidable members carry the top parts of the mold.

A piston 7 in the cylinder 3 is connected by the rod 8 to the yoke 4, heretofore referred to. A constant pressure inlet 9 is connected with the space in the cylinder 3 above the piston 7 and an inlet valve control 10 is connected to the space below the piston 7. The operation of the piston of this differential cylinder 3 is controlled in the usual manner by means of the controlled admission of pressure to the said spaces above and below the piston, the release of pressure or the balancing of the pressures, as will be understood, to raise or lower the yoke 4 to which the slidable members carrying the upper mold cavity sections are attached.

Referring now to Figs. 3 to 7, two of the lower die or mold sections are shown at 11 and the cooperating or upper cavity mold sections are shown at 12. A threaded pin 13 extends through an opening in each of the upper cavity mold sections 12, the opening providing a snug fit. One or more heater plates, indicated at 14, which may be provided with passages for passing steam therethrough or with electrical heating means, as may be desired, are provided, it being understood that a cooling medium may also be utilized in connection therewith, in the usual manner, if desired. An opening through these upper plates 14 is provided for the pin 13, the opening being of a size to provide a small clearance around the pin 13. The pin 13 at this point, immediately above the plates 14, is tapered in the form of an inverted cone, 15, its upper end providing a shoulder engaging the upper side of a recess or slot 16 provided in the top grid member 17, the pin 13 extending upwardly therefrom and having a collar attached thereto, indicated at 18, which collar engages the lower side of another recess in the top grid 17, this collar 18 and the shoulder formed by the cone 16 holding the pin 13 in position in the top grid 17 and permitting the turning thereof by means of the squared upper end 19 at the upper end of the pin 13 which is engaged in a correspondingly shaped chuck member 20, which, in turn, is engaged at its upper end with a squared projection 29 extending from a crank member 28, which is rotated by an oscillating member 27 operated by an eccentric member 30, which is rotated by and mounted upon a shaft 31 carried in a bearing 32 and, in turn, rotated by a bevel gear, or other suitable means, 33 engaging a gear 34 (Fig. 1) carried by a shaft 35 rotated by means of a pulley, or other suitable means, 36 connected with a driving means. All of the respective crank members 28 and associated parts are rotated simultaneously by the said oscillating member 27, as will be understood by reference to the drawings.

The upper die or cavity mold sections 12 are carried or held by means of a top holding plate 21 against the upper heater plates 14. The mold sections are provided with a flange shaped to engage the plate 21 and prevent rotation thereof.

The lower die or mold sections 11 are correspondingly held by means of a bottom holding plate 22 securing the same against the lower heater plates 23, which are similar in construction and arrangement to the upper heater plates 14, heretofore described.

These parts, as shown in Fig. 4, are mounted upon the lower grid 24 which is carried upon the bottom platen 25 (Fig. 1) of the press 1. The several parts, as shown in Fig. 3, are carried by the top platen 26 and head 2 of the press. The top grid 17 and the threaded pins 13 are mounted in position on the top platen 26 while the upper cavity mold sections 12, the top holding plate 21 and the upper heating plates 14 are secured together and are slidable on the threaded pins 13, being carried by the yoke 4 of the differential cylinder 3, by means of which these parts may be moved or slid on the pin 13, as described.

As illustrative of one object which may be formed or molded from thermo-plastic material, a small threaded cap is shown in Figs. 8 and 9, having a hexagon-shaped flange 37 or other shape, as desired, and one or more ribs 38 formed in the outer face of the skirt. The purpose of these ribs 38 is to prevent the cap from turning in the mold when the threaded pin 13 is rotated, the mold section 12 being provided with complementary recesses in which the ribs are formed in the skirt of the cap. This is one form of cap and means for preventing the rotation thereof, but it is understood that many other forms and means accomplishing this purpose may be used.

The raising and lowering of the lower mold sections 11 holding plate 22, heater plates 23 and lower grid 24 is accomplished by means of the ram of the press 1, which raises and lowers the lower platen 25 on which these parts are carried. In Figs. 1, 2, 3 and 4, the parts are shown in their open or lowered position while in Fig. 5 the same are shown in closed position, the lower platen and parts carried thereby having been raised, as described.

The heater plate 14, top holding plate 21 and upper cavity mold sections 12, secured together as a unit, as described, are moved or slid on the pin 13 by means of the differential cylinder 3, the operation of which is controlled by the relative pressures maintained and controlled on either side of the piston 7 by means of the inlet pipe and valve control pipe, 9 and 10. In their upper position, the parts are in the position shown in Fig. 3, while the lower position is shown in Fig. 7, in which the heater plates 14 and the top grid 17 are separated, the lower mold section 12 being slid downwardly on the pin 13 so that the lower threaded end is removed from the mold cavity. In this position, the plastic material may be inserted in the mold cavity, the lower part of the press operated to raise the lower grid 24 and parts carried thereon (Fig. 4) and close the mold sections and move the upper mold sections 12 (Fig. 3) and plates 14 against the top grid 17, causing the pin 13 to enter the mold cavity, the threaded end thereof forming the threaded portion inside the skirt of the object as molded. That portion of the rind which is forced upwardly around the pins 13 upon reaching the conical portion 15 (Fig. 3) of the pins 13 is broken up and may be readily removed from the recess or slot 16 by a jet of air, or otherwise, as desired.

The lower portion of the press is then moved to its lower position (Figs. 1 and 2), the pin 13 rotated, by means of the connections heretofore described, unscrewing the same from the molded cap, which is moved downwardly thereon and ejected out of the cavity mold, as shown in Fig. 6, falling into a receptacle which may be placed under the upper mold sections.

It will be noted that the pins 13 are rotated in a fixed plane to unscrew the same from the molded cap and are not moved in a longitudinal direction, thus causing the cap, which is held against rotation, to be moved downwardly and ejected from the mold automatically without removing any part of the mold from the press, this ejecting action taking place simultaneously for all of the molded objects.

The differential cylinder 3 operates to lower the plates 14 and 21 and the upper cavity mold sections 12 to the position shown in Fig. 7, retracting the threaded end of the pin 13 from the mold cavity, leaving the same ready for the reception of another charge, as has been described. This oscillating movement of the said parts on the pins 13 also produces a scavenging action, assisting in the removal of the rind from the pins, and a follow-up action holding the molded cap being ejected by the rotation of the pins 13 from rotation until the same leave the ends of the pins and drop into a receptacle, which may be placed under the upper mold sections. This is especially useful in the case of objects having a long skirt or threaded portion, as will be readily appreciated.

It will thus be seen that any number of articles, within the capacity of the press, may be simultaneously molded and ejected from the molds automatically, without manual operation or handling of the molds or molded objects. This results in an increased speed of operation and capacity for production as well as a decreased cost.

What I claim as new and desire to secure by Letters Patent is:—

1. In combination with a molding machine of the class described adapted to form a threaded portion in the object to be molded, of a thread forming member mounted and adapted to be rotated in a fixed plane, and means mounted and incorporated in the molding machine for unscrewing the thread forming member from the molded object and ejecting the same from the mold.

2. In combination with a molding machine of the class described adapted to form a threaded portion in a number of objects to be simultaneously molded, of a plurality of thread forming members mounted and adapted to be rotated simultaneously in a fixed plane, and means mounted and incorporated in the molding machine for simultaneously and automatically unscrewing the thread forming members from the molded objects and ejecting the same from the molds.

3. In combination with a molding machine of the class described adapted to form a threaded portion in a number of objects to be molded, of a plurality of thread forming members mounted and adapted to be rotated in a fixed plane, means for moving said molds upon said thread forming members to cause the same to be extended into or withdrawn from each respective mold cavity, and means for unscrewing said thread forming member from the molded objects and ejecting the same from the mold.

4. In a molding machine, in combination with a plurality of molds carried thereby, of a threaded pin adapted to be extended into the mold cavity of each of said molds, one section of each of said molds being slidably mounted upon one of said pins, said pin being formed with a conical shaped portion intermediate its ends adapted to break up the rind forced out of the mold around said pin, and means for rotating said pin to unscrew the threaded portion thereof from said molded object and eject the same from the mold.

5. In combination with a molding machine of the class described adapted to form a number of molded objects from thermo-plastic material and provided with heater plates and upper and lower mold sections mounted adjacent thereto, of a threaded pin for each mold and upon which the upper cavity section of said mold is slidably mounted and having a threaded end adapted to be brought into and out of the cavity of said mold, said pin passing through said upper mold section and upper heating plate and being provided with a conical section tapered upwardly with its upper side providing a shoulder engaging the upper side of a recess in the top grid member and extending upwardly therefrom and provided with a collar attached thereto and engaging the lower side of another recess in the said top grid member thus holding the pin in position in the said top grid member and permitting the rotation thereof in a fixed plane, and means for rotating said pin to cause the molded object in the mold section to be ejected therefrom.

6. In combination with a molding machine of the class described adapted to form a number of molded objects from a thermo-plastic material and provided with heater plates and upper and lower mold sections mounted adjacent thereto, of a threaded pin for each mold upon which the upper cavity section of said mold is slidably mounted and having a threaded end adapted to be brought into and out of the cavity of said mold, means for rotating said pin to cause the molded object in the mold section to be ejected therefrom without removing the molds or pins from the machine, and means for sliding the upper cavity section of said mold upon said pin, said means for rotating said pins and for sliding the molds on the individual pins operating simultaneously for all of said molds and pins and incorporated in as a part of said molding machine.

7. In combination with a molding machine having a number of cavity mold sections arranged in vertically positioned pairs adapted to be brought together under pressure to form the objects to be molded, of a number of rotatable thread forming members each extending through and into one of the upper cavity mold sections, means carrying said upper cavity mold sections adapted to relatively move said upper mold sections longitudinally on said thread forming member to insert and retract the threaded portion thereof into and out of the upper mold sections, and means mounted and incorporated in the molding machine for simultaneously and automatically unscrewing the thread forming members from the molded objects and ejecting the same from the said upper cavity mold sections.

8. In combination with a molding machine having a number of cavity mold sections arranged in vertically positioned pairs adapted to be brought together under pressure to form the objects to be molded, of a number of rotatable pins each having a threaded end extending through and into one of the upper cavity mold sections, means carrying said upper mold sections adapted to move said sections longitudinally on said pins to insert and retract the threaded ends thereof into and out of the said upper cavity mold sections, a separable coupling for each of said pins, and means connected to said pins by said couplings for unscrewing the threaded ends thereof simultaneously from the molded objects and automatically ejecting the same from the molds.

WALTER E. RAHM.